(12) United States Patent
Barel et al.

(10) Patent No.: US 11,586,512 B2
(45) Date of Patent: Feb. 21, 2023

(54) DYNAMIC DATA STORAGE

(71) Applicant: Specterx N.D. LTD, Tel Aviv (IL)

(72) Inventors: Nimrod Barel, Tel Aviv (IL); Daniel Barel, Tel Aviv (IL)

(73) Assignee: Specterx N.D. Ltd, Tel Aviv (IL)

( * ) Notice: Subject to any disclaimer, the term of this patent is extended or adjusted under 35 U.S.C. 154(b) by 385 days.

(21) Appl. No.: 16/645,387

(22) PCT Filed: Sep. 6, 2018

(86) PCT No.: PCT/IL2018/051007
§ 371 (c)(1),
(2) Date: Mar. 6, 2020

(87) PCT Pub. No.: WO2019/049147
PCT Pub. Date: Mar. 14, 2019

(65) Prior Publication Data
US 2020/0293413 A1     Sep. 17, 2020

(30) Foreign Application Priority Data

Sep. 11, 2017  (IL) .......................................... 254433

(51) Int. Cl.
*G06F 7/00*     (2006.01)
*G06F 16/00*    (2019.01)
(Continued)

(52) U.S. Cl.
CPC ...... *G06F 11/1484* (2013.01); *G06F 9/45558* (2013.01); *G06F 11/1464* (2013.01); *G06F 11/1469* (2013.01); *G06F 16/188* (2019.01); *G06F 21/6218* (2013.01); *H04L 12/4633* (2013.01); *G06F 2009/45587* (2013.01); *G06F 2009/45595* (2013.01)

(58) Field of Classification Search
None
See application file for complete search history.

(56) References Cited

U.S. PATENT DOCUMENTS 10,983,908 B1 *  4/2021  Zou ..................... G06F 12/0253
2013/0086642 A1 *  4/2013  Resch ................... H04L 9/3263
726/4

(Continued)

OTHER PUBLICATIONS

International Search Report and Written Opinion of the International Searching Authority, dated Dec. 13, 2018, for corresponding International Application No. PCT/IL2018/051007, 7 pages.

*Primary Examiner* — Tuan A Pham
(74) *Attorney, Agent, or Firm* — Klarquist Sparkman, LLP

(57) ABSTRACT

A method for dynamically storing files/data, comprising: a) acquiring the file/data by an initial random Virtual Machine (r VM); b) shredding the file/data to a plurality of segments; c) wrapping, in a standalone state, each of the remaining segments with a unique code comprised of at least one or more destination storage locations, a pointer to a following segment in the file/data, and a timer; d) autonomously and independently roaming each segment to the destination storage location appearing in its unique code; and e) periodically, according to the timer, continuously roaming segments between storage locations until receiving a request for retrieving of the dynamically stored file/data.

11 Claims, 3 Drawing Sheets

(51) Int. Cl.
    *G06F 11/14*     (2006.01)
    *G06F 9/455*     (2018.01)
    *G06F 21/62*     (2013.01)
    *H04L 12/46*     (2006.01)
    *G06F 16/188*     (2019.01)

(56) References Cited

U.S. PATENT DOCUMENTS

2014/0136832 A1    5/2014    Klum et al.
2014/0181987 A1    6/2014    Patawaran et al.
2015/0356114 A1*  12/2015   Smith ..................... H04L 65/75
                                                             707/756
2019/0073520 A1*   3/2019   Ayyar ..................... G06V 20/41

* cited by examiner

DYNAMIC DATA STORAGE

CROSS REFERENCE TO RELATED APPLICATIONS

This is the U.S. National Stage of International Application No. PCT/IL2018/051007, filed Sep. 6, 2018, which in turn claims priority to Israel Patent Application No. IL254433, filed Sep. 11, 2017. The priority application is incorporated herein in its entirety.

FIELD OF THE INVENTION

The present invention relates to the field of data storage and security. More particularly, the invention relates to a system and method for dynamically storing files at random network locations.

BACKGROUND OF THE INVENTION

In today's world, data is commonly required to be available anytime and anywhere. These requirements expose data to security risks, some of which isn't known by data owners. The average cost of a corporate data breach is estimated at millions of dollars. As the availability requirement grows, along with hacking sophistication abilities, this average cost is expected to grow, as more public and private sector takedowns, hacks and exposure of sensitive personal information are expected to occur.

Presently several solutions exist, mainly revolving around an inherent coupling between system performance (e.g. data integrity), availability and security. This approach results in high vulnerability of data created and managed on platforms where availability and performance are guaranteed. One explanation for this vulnerability is the relatively low level of ease and simplicity that static data locations can be targeted, therefore making such data vulnerable to hacks, data theft or harm. Other approaches entail compromising on availability and/or performance, which in many cases is less preferable than security.

It would be profitable to have a system and/or method capable of dynamically (i.e. non-statically) storing data while decoupling the link and co-influence between data integrity, availability and security requirements.

It is therefore an object of the present invention to describe a system and method for dynamically storing data.

It is yet another object of the present invention to provide a system and method for allowing owners of data to securely and seamlessly create data on an agile platform that maintains data integrity while minimizing a security breach caused by elimination of data in a single location.

It is still another object of the present invention to provide a system and method for removing the ability to target data at any point, thereby making all current cyber-attack tactics obsolete while keeping user interface and interaction unchanged and familiar.

Other objects and advantages of this invention will become apparent as the description proceeds.

SUMMARY OF THE INVENTION

A method for dynamically storing files/data, comprising:
a. acquiring the file/data by an initial random Virtual Machine (rVM);
b. shredding the file/data to a plurality of segments;
c. wrapping, in a standalone state, each of the remaining segments with a unique code comprised of at least one or more destination storage locations, a pointer to a following segment in the file/data, and a timer;
d. autonomously and independently roaming each segment to the destination storage location appearing in its unique code; and
e. periodically, according to the timer, continuously roaming segments between storage locations until receiving a request for retrieving of the dynamically stored file/data.

According to an embodiment of the invention, the initial rVM is allocated by a Software as a Service (SAAS) upon receiving a user's request for a file/data to be dynamically stored.

According to an embodiment of the invention, at least two predefined segments possess relative portion of an address of a secure target rVM for future Software as a Service (SAAS) allocation in order to retrieve the dynamically stored file/data.

According to an embodiment of the invention, the retrieving of the dynamically stored file/data, comprising:
a. periodically inquiring the SAAS by each segment, according to the timer of the unique code of each segment, whether a request for the file/data has been received;
b. validating the identity and credentials of a user;
c. receiving at the SAAS a request for the file/data from the user;
d. obtaining, by the SAAS, the secure target rVM address by retrieving the relative portions of the address from each of the at least two segments;
e. creating, by the SAAS the secure target rVM and validating its secureness;
f. terminating the connection of the SAAS with the target rVM;
g. autonomously swarming all of the relevant file/data segments to the pre-defined target rVM;
h. reconsolidating, by the target rVM, all of the segments and rebuilding the original file/data according to the pointers in the unique code of each segment;
i. establishing, by the target rVM, a secure tunnel to the computerized system of the user, performing post identity validation and retrieving the predefined one of the segments which is locally stored on the user's system; and
j. granting, by the target rVM relevant access level to the user on a remote connection.

According to an embodiment of the invention, the SAAS resides on a virtual machine (VM).

According to another embodiment of the invention, shredding of the file/data is performed according to Shamir's Secret Sharing algorithm.

According to another embodiment of the invention, while segments roam between storage locations, no two segments reside at a single storage location. According to yet another embodiment of the invention, one segment of the file/data is stored on the local user's system. According to still another embodiment of the invention, the unique code further comprises pointers pointing to the adjacent segments as was originally arranged in the file/data before shredding.

According to an embodiment of the invention, the segments are backed up periodically.

According to another embodiment of the invention, identical copies of segments are saved on storage locations before they roam to their respective next storage locations; and wherein the identical copies comprise an algorithm allowing them to self-destruct.

According to an embodiment of the invention, the initial rVM acquires the file/data by creating a secure tunnel to a computerized system of the user.

According to an embodiment of the invention, the method further comprises auto-terminating the initial rVM.

DETAILED DESCRIPTION OF THE INVENTION

Figure 1:
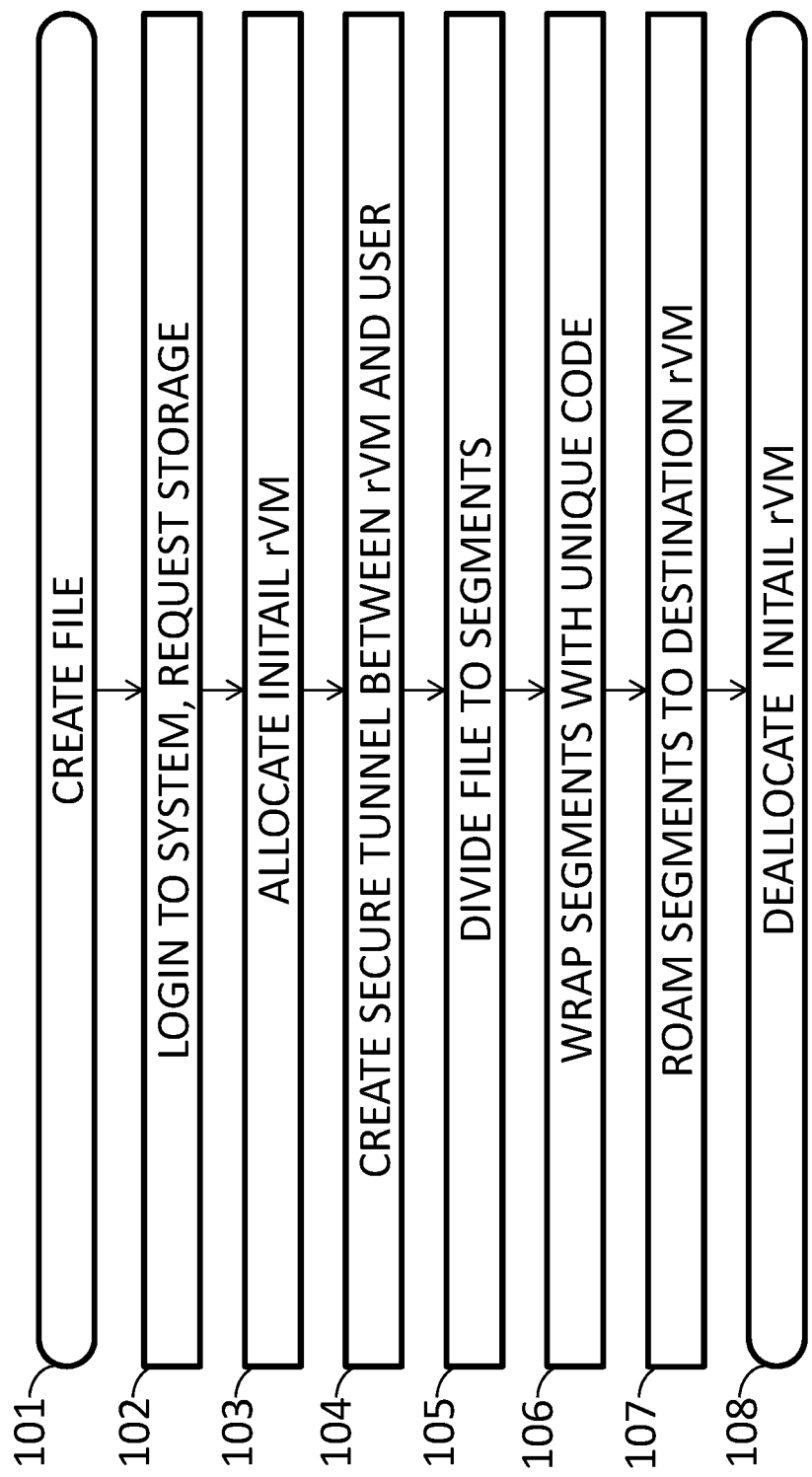
FIG. 1 shows a block diagram of a method for dynamically storing a file according to an embodiment of the present invention.

Reference will now be made to an embodiment of the present invention, examples of which are illustrated in the accompanying figures for purposes of illustration only. One skilled in the art will readily recognize from the following description that alternative embodiments of the structures and methods illustrated herein may be employed, mutatis mutandis, without departing from the principles of the claimed invention.

According to an embodiment of the invention, a file is securely uploaded by remote server (hereinafter 'Software as a Service' or 'SAAS'), that is associated with the system of the present invention, to a random virtual machine (VM) where it is segmented (shredded) to a plurality of segments. According to an embodiment of the invention, the SAAS itself resides on a VM. Each segment is wrapped with a unique software code, and according to parameters within the unique code the segments are each sent to a different storage platform or location some of which utilize serverless computing, besides one particular segment that is stored on the user machine regardless of the VMs to which the other segments of the same file were sent. While a segment is in storage (idle) state the unique code periodically inquires the SAAS to detect if the file from which it is segmented has been requested by a user. In addition, during idle state the segment constantly roams from one storage platform or location to another, according to parameters within the unique code. Upon detecting that the file has been requested, the segment (along with all other segments of the file) initiates a swarm protocol to move to a new random VM on which the segments are reconstructed to form the original file. Prior to creating the random VM it is fully validated to be safe and without malicious code. The last step of consolidation (reconstruction) would be the adding of the locally stored segment from the users' system. Post reconstruction access to the data is granted to the user.

Accordingly, segments are wrapped by a unique code, comprising several parameters that are essential for the dynamic roaming of each file segment and for successfully consolidating files. A first parameter comprises a destination algorithm defining the roaming scheme of the segment though the different storage platforms and addresses. The algorithm is based on a random calculation that enables the segment to constantly roam without leaving any trace. A second parameter comprises an algorithm to determine the random VM on which the data will be reconstructed upon initiating the swarm protocol generated by the user retrieval request. This parameter is common for all the segments of a single file. A third parameter comprises a unique pointer linking each segment to the segment following it in the original file. Obviously the third parameter of the last segment is void. Another parameter in the unique code is a timer for measuring predefined periods of time between each roam and other periods of times. The unique code further comprises the address and communication details of the SAAS.

FIG. 1 shows a block diagram of a method for dynamically storing a file according to an embodiment of the present invention. At the first stage 101 a file to be stored is created by a user. The file can comprise data of any type or size that is to be stored securely in a remote memory unit. At the next stage 102, the user utilizes a user interface, installed in advance on the user's system, to log in to the dynamic storage system and request for the file to be dynamically stored. At the next stage 103, the SAAS creates (allocates) an initial random virtual machine (rVM) being a virtual machine residing on a random location across the internet fully validated not to contain a malicious code. At the next stage 104 the initial rVM creates a secure tunnel with the user's system, and the initial rVM acquires the file. According to an embodiment of the invention, the tunnel is secure by an end to end encrypted tunneling protocol. At the next stage 105, the initial rVM shreds (performs segmentation) the file to segments. According to an embodiment of the invention, the data shredding (segmentation) is performed according to (prior art) Shamir's Secret Sharing algorithm. At the next stage 106, each segment is wrapped with a unique code, as explained above. At the next stage 107, each of the segments automatically roams from the initial rVM to a destination storage location, regardless of the destination storage locations of other segments, solely and independently according to the pre-programmed algorithm and parameters contained in the unique code by which each segment is wrapped and without centralized control or management. At the next and final stage 108 of dynamically storing data, the initial rVM that was created in stage 103 is terminated thereby making it impossible to track the data or a file segment.

According to an embodiment of the invention, a file can be created after the user logs in to the storage system, thereby utilizing resources of a VM not only for storing but also for creating and editing files.

Figure 2:
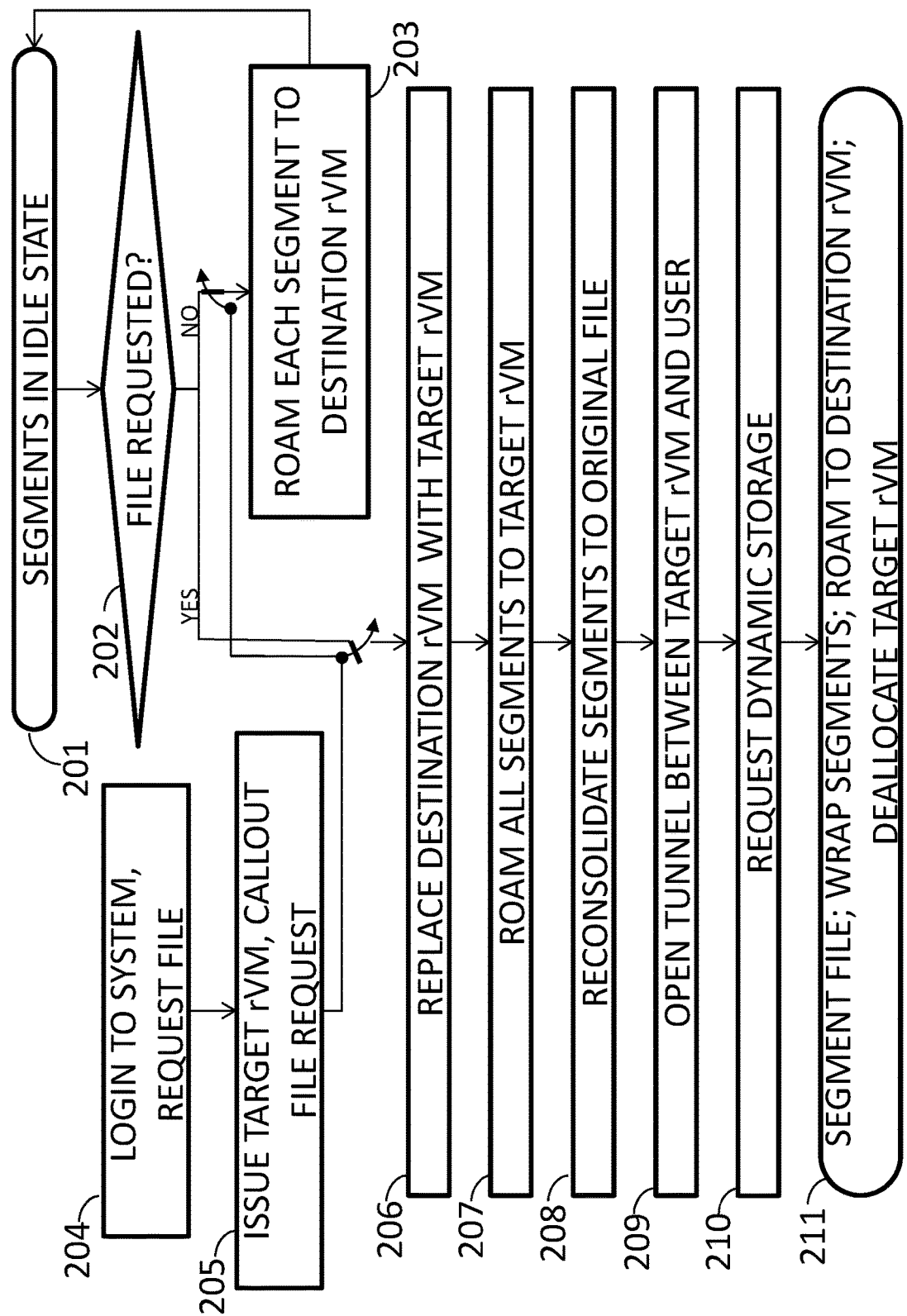
FIG. 2 shows a block diagram of a method for retrieving a dynamically stored file according to an embodiment of the present invention.

FIG. 2 shows a block diagram of a method for retrieving a dynamically stored file according to an embodiment of the present invention. At the first stage 201 a plurality of segments to which the file was previously segmented are in idle state. In this state each segment resides at a different storage location. At stage 202 an algorithm within the unique code wrapping the segment causes the segment to send an inquiry to the SAAS inquiring if the file from which it is segmented from has been requested by a user. If no request is detected, then at stage 203 each segment continues to roam (according to commands and parameters contained in the unique code) from its respective storage location to a random destination storage location and returns to idle state (stage 201).

According to an embodiment of the invention, the roaming of each segment may involve the following "copy-delete" procedure:

copying the segment from its respective storage location to a random destination storage location, thus after completing the copy action, the segment is temporary located in both storage locations (i.e., at the respective storage location and at the random destination storage location); and deleting the segment from the respective storage location, thus the segment will only remain in the random destination storage location (that becomes now the "new" respective location).

Such "copy-delete" procedure enables each segment to roam from one storage destination to another.

When a user eventually logs in to the system (post user validation protocol) of the invention, and requests the file (i.e. at stage 204), the SAAS initiates the swarm protocol to signal all relevant segments to start moving to a pre-assigned rVM (the pre-assigned rVM refers herein to a secure target rVM or shortly a target rVM that represents the "geo-location" where the segments will be joined and restructured into the whole file/data). According to an embodiment of the present invention, at least two segments, e.g., the first and last segments of a segmented file (i.e., the head and tail segments), are each assigned with a relative portion of the address of the pre-assigned rVM for the SAAS (e.g., the head and tail segments each possess half of address of the secure target rVM). Each provides the SAAS with the address portion allowing the SAAS to securely create and allocate an rVM according to the pre-defined information obtained from the segments, at stage 205, to which all relevant segments will swarm and will be restructured into the whole file/data, after which the connection of the SAAS with the target rVM is terminated. Consequently the inquiring algorithm of each segment detects the user's request and at stage 206 the destination storage location is replaced with the location of the target rVM. At stage 207 all of the segments roam to the target rVM from each of their respective storage locations. At stage 208 the segments reconsolidate into the original file. At the next stage 209, a secure end-to-end tunnel is established between the rVM and the user's system, the rVM performs post authentication, and finally retrieves the last segment from the user's machine, after which the user is granted access to the file (still residing on the secure target rVM). At this stage the file can be updated, edited etc. Once the user finishes using the file/data and at stage 210 requests to once again dynamically store the file, then at stage 211 the file is once again segmented, one segment is sent to the user's system, the connection to the user's system is terminated and at this stage of standalone each remaining segment is then wrapped by a unique code, and then each segment roams to a new destination storage location, and once all segments have swarmed out of the rVM the rVM shuts-down and terminates.

According to an embodiment of the invention, never at any point during idle state do two or more different segments of a single file reside at a single location (e.g. storage cluster or location). According to another embodiment of the invention, one segment of each file is stored on the local user side device.

According to an embodiment of the invention, besides a pointer pointing to the following segment in the original file, each segment further comprises a pointer pointing to the adjacent segment in the original file. When comparing the pointers the segments are able to independently (by help of suitable software of a rVM) combine themselves properly into the original file without the use of a general index. According to an embodiment of the invention, the first segment of a file comprises a head indicator marking it as the first segment, whereas the last segment comprises a tail indicator.

According to an embodiment of the invention, data is automatically backed up periodically. The backup can be at the segment level or at another level. According to a predefined backup algorithm a segment can leave an identical copy of itself (with a firm tractability capability) on a storage location before roaming to next storage location, allowing for backup and redundancy of the "old" segment. The predefined backup algorithm decides how many active versions can co-exist simultaneously. According to an embodiment of the present invention, segments comprise self-destruct capabilities. In order to call to an "old" version of the file, the SAAS points relevant segments to the user based on hashes of the segment.

Figure 3:
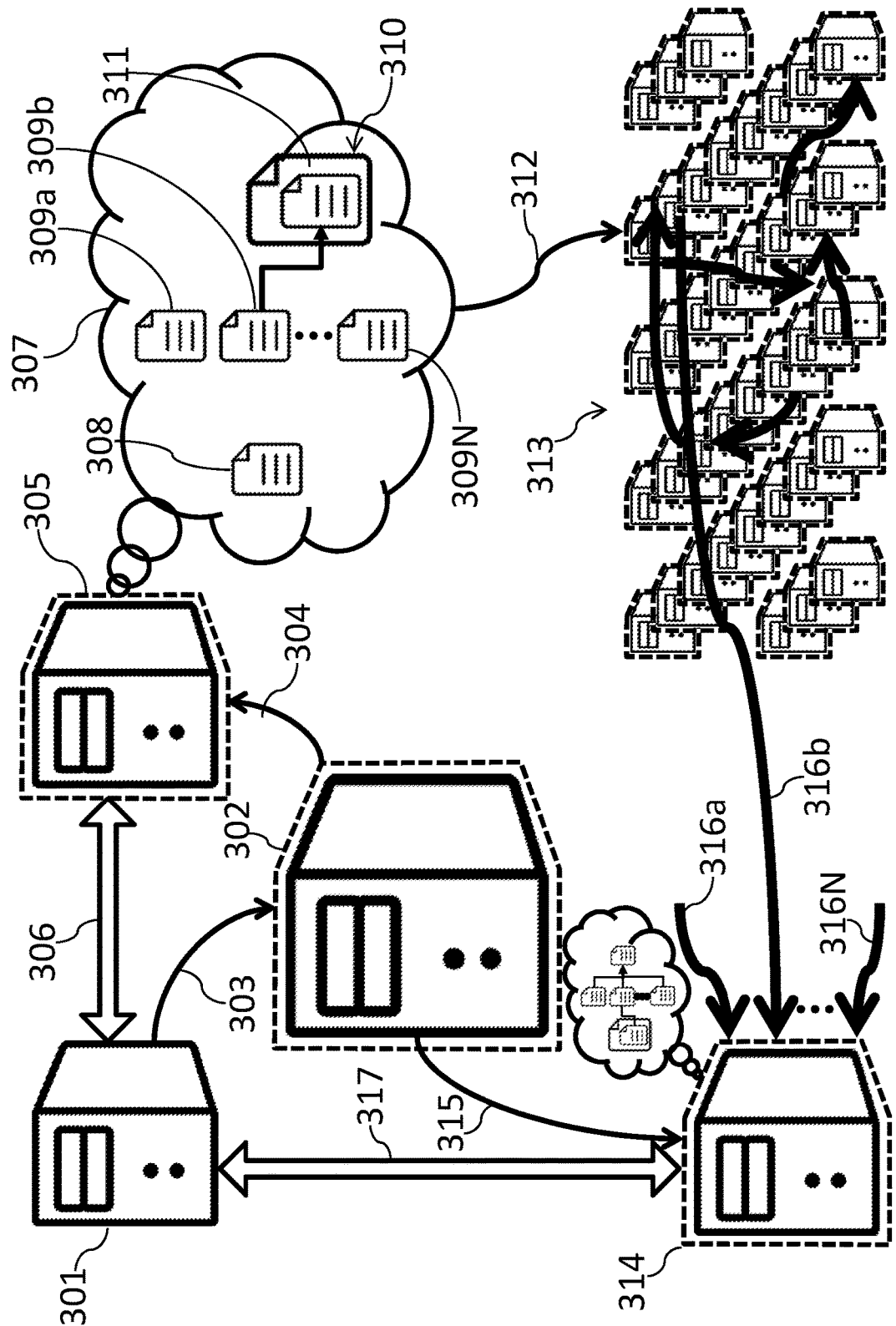
FIG. 3 schematically illustrates a system for securely and dynamically creating and storing files, according to an embodiment of the invention.

FIG. 3 schematically illustrates a system for securely and dynamically creating and storing files, according to an embodiment of the invention. A user's side physical computing device 301 activates a user interface, and thereby communication 303 with SAAS 302 is established wherein SAAS 302 (in the embodiment of FIG. 3) is a VM. A temporary rVM 305 is created and validated 304 by the SAAS after recognizing and approving credentials and identity of the user. Secure tunnel 306 is established by rVM 305. rVM 305 comprises algorithms (generally denoted by numeral 307) configured to perform segmentation of files (e.g. 308) to N segments, 309a-309N, wherein N is determined according to the segmentation algorithm's (e.g. Shamir secret sharing) optimal value, and to wrap each segment 309 with unique code 311, thereby creating a new file 310 containing the segmented data (e.g. 309b) and unique code 311. The unique code 311 comprises the address of SAAS 302, the address of a destination rVM and a unique pointer linking each segment to the segment following it in the original file. Code 311 further comprises software commands suitable to execute roaming, reconsolidation, communicate with the SAAS, etc. that are to be executed by a rVM at which file 310 resides. Accordingly each newly created file, e.g. 310, is sent 312 to a storage location chosen randomly from a group of storage locations 313. Some of rVMs 313 are illustrated with connecting one headed arrows for illustrating the roaming of a file from one rVM to another.

When SAAS 302 receives a request for a file (e.g. 308), temporary rVM 314 is allocated 315 by the SAAS. Each of the segment containing files (e.g. 310) detects the request and receives the location of rVM 314, sets it as the segment's next destination rVM, and finally roams 316a-316N to rVM 314. Once a file is consolidated at rVM 314 a secure tunnel 317 is created by rVM 302 to user side 301. As explained above, once use of the file is finished the file is again segmented, each segment is wrapped and roams to another storage location, and rVM 314 is deallocated.

Although embodiments of the invention have been described by way of illustration, it will be understood that the invention may be carried out with many variations, modifications, and adaptations, without exceeding the scope of the claims.

The invention claimed is:

1. A method for dynamically storing and retrieving files/data, comprising:
   a. acquiring the file/data by an initial random Virtual Machine (rVM);
   b. shredding the file/data to a plurality of segments;
   c. wrapping, in a standalone state, each of the remaining segments with a unique code comprised of at least one or more destination storage locations, a pointer to a following segment in the file/data, and a timer;

d. autonomously and independently roaming each segment to the destination storage location appearing in its unique code; and
e. periodically, according to the timer, continuously roaming segments between storage locations until receiving a request for retrieving of the dynamically stored file/data, wherein each of at least two predefined segments possesses a relative portion of an address of a secure target rVM for future Software as a Service (SAAS) allocation in order to retrieve the dynamically stored file/data;
f. periodically inquiring the SAAS by each segment, according to the timer of the unique code of each segment, whether a request for the file/data has been received;
g. validating the identity and credentials of a user;
h. receiving at the SAAS a request for the file/data from the user;
i. obtaining, by the SAAS, the secure target rVM address by retrieving the relative portions of the address from each of the at least two predefined segments;
j. creating, by the SAAS, the secure target rVM and validating its secureness;
k. terminating the connection of the SAAS with the target rVM;
l. Autonomously swarming all of the relevant file/data segments to the pre-defined target rVM;
m. reconsolidating, by the target rVM, all of the segments and rebuilding the original file/data according to the pointers in the unique code of each segment;
n. establishing, by the target rVM, a secure tunnel to a user's system, performing post identity validation and retrieving one of the two predefined segments which is locally stored on the user's system; and
o. granting, by the target rVM, relevant access level to the user on a remote connection.

2. A method according to claim 1, wherein the initial rVM is allocated by the SAAS upon receiving a user's request for a file/data to be dynamically stored.

3. A method according to claim 2, wherein the SAAS resides on a virtual machine (VM).

4. A method according to claim 1, wherein shredding of the file/data is performed according to Shamir's Secret Sharing algorithm.

5. A method according to claim 1, wherein while segments roam between storage locations, no two segments reside at a single storage location.

6. A method according to claim 1, wherein one segment of the file/data is stored on the user's system.

7. A method according to claim 1, wherein the unique code further comprises pointers pointing to adjacent segments as originally arranged in the file/data before shredding.

8. A method according to claim 1, wherein the segments are backed up periodically.

9. A method according to claim 8, wherein identical copies of segments are saved on storage locations before they roam to their respective next storage locations; and wherein the identical copies comprise an algorithm allowing them to self-destruct.

10. A method according to claim 1, wherein the initial rVM acquires the file/data by creating a secure tunnel to the user's system.

11. A method according to claim 1, further comprising auto-terminating the initial rVM.

* * * * *